(12) United States Patent
Winzell et al.

(10) Patent No.: US 11,457,205 B2
(45) Date of Patent: Sep. 27, 2022

(54) THERMAL HEALTH MONITORING SENSOR

(71) Applicant: Axis AB, Lund (SE)

(72) Inventors: Thomas Winzell, Lund (SE); Jesper Bengtsson, Lund (SE); Mats Bylander, Lund (SE)

(73) Assignee: AXIS AB, Lund (SE)

( * ) Notice: Subject to any disclaimer, the term of this patent is extended or adjusted under 35 U.S.C. 154(b) by 1 day.

(21) Appl. No.: 17/109,770

(22) Filed: Dec. 2, 2020

(65) Prior Publication Data

US 2021/0176457 A1 Jun. 10, 2021

(30) Foreign Application Priority Data

Dec. 5, 2019 (EP) .................................... 19213800

(51) Int. Cl.
| | |
|---|---|
| *H04N 17/02* | (2006.01) |
| *H04N 17/00* | (2006.01) |
| *G01J 5/02* | (2022.01) |
| *G01J 5/00* | (2022.01) |
| *H04N 5/33* | (2006.01) |
| *G01J 5/80* | (2022.01) |

(52) U.S. Cl.
CPC ............ *H04N 17/002* (2013.01); *G01J 5/025* (2013.01); *G01J 5/80* (2022.01); *G01J 2005/0077* (2013.01); *H04N 5/33* (2013.01)

(58) Field of Classification Search
CPC ......... H04N 17/002; H04N 5/33; G01J 5/025; G01J 5/80; G01J 2005/0077
USPC .................................................. 348/187, 175
See application file for complete search history.

(56) References Cited

U.S. PATENT DOCUMENTS

| | | | |
|---|---|---|---|
| 5,151,682 A | 9/1992 | Marinitsch | |
| 6,683,643 B1 | 1/2004 | Takayama et al. | |
| 8,908,046 B1* | 12/2014 | Johannesson | G08B 29/24 348/175 |
| 8,964,030 B2* | 2/2015 | Itoh | G06V 10/30 348/143 |
| 9,674,458 B2* | 6/2017 | Teich | H04N 5/332 |
| 9,948,906 B2* | 4/2018 | Takeuchi | G08B 29/046 |

(Continued)

FOREIGN PATENT DOCUMENTS

| | | |
|---|---|---|
| EP | 3062074 A1 | 8/2016 |
| GB | 2518224 A1 | 3/2015 |

(Continued)

OTHER PUBLICATIONS

Hollands et al., "Effects of Resolution, Range, and Image Contrast on Target Acquisition Performance," vol. 60 issue: 3, pp. 363-383 (Mar. 5, 2018).

(Continued)

*Primary Examiner* — Trang U Tran
(74) *Attorney, Agent, or Firm* — Volpe Koenig

(57) ABSTRACT

Methods and apparatus, including computer program products, for detecting malfunction in a thermal camera. A first average response value is determined for a first shutter image captured by an image sensor in the thermal camera. A second average response value is determined of a second shutter image captured by the image sensor in the thermal camera. The first average response value and the second average response value are compared. In response to determining that the first average response value and the second average response value differ by more than a predetermined value, an indication of a malfunction of the thermal camera is provided.

12 Claims, 2 Drawing Sheets

(56) References Cited

U.S. PATENT DOCUMENTS

| | | |
|---|---|---|
| 2005/0029453 A1 | 2/2005 | Allen et al. |
| 2005/0258367 A1 | 11/2005 | Anderson et al. |
| 2007/0126869 A1 | 6/2007 | Montminy et al. |
| 2009/0060369 A1 | 3/2009 | Agarwala et al. |
| 2009/0273675 A1 | 11/2009 | Jonsson |
| 2015/0271471 A1 | 9/2015 | Hsieh et al. |
| 2017/0160140 A1 | 6/2017 | Zhao et al. |
| 2018/0234616 A1 | 8/2018 | Kamat |
| 2019/0101410 A1 | 4/2019 | Kuper et al. |
| 2019/0355138 A1 | 11/2019 | Hall et al. |
| 2020/0028996 A1 | 1/2020 | Feng |
| 2021/0293626 A1 | 9/2021 | Winzell et al. |

FOREIGN PATENT DOCUMENTS

| | | |
|---|---|---|
| JP | 2004-336153 A | 11/2004 |
| JP | 2007-300547 A | 11/2007 |
| JP | 2011-259034 A | 12/2011 |
| JP | 2012-028992 A | 2/2012 |
| TW | 201013172 A | 4/2010 |
| WO | 2017/105846 A1 | 6/2017 |

OTHER PUBLICATIONS

Extended European Search Report dated Jun. 24, 2020 for the European Patent Application No. 19213795.8.

Communication pursuant to Article 94(3) EPC dated Jul. 29, 2021 for European Patent Application No. 19 213 795.8.

Extended European Search Report dated Jul. 14, 2020 for the European Patent Application No. 19213800.6.

Tomasz Orżanowski, "Modified two-point calibration algorithm for infrared focal plane arrays," Proc. SPIE 10433, Electro-Optical and Infrared Systems: Technology and Applications XIV, 104330J (Oct. 6, 2017).

\* cited by examiner

THERMAL HEALTH MONITORING SENSOR

BACKGROUND

The present invention relates to thermal cameras, and more specifically to automatically detecting various types of malfunction in a thermal camera.

Thermal cameras are used in a wide variety of monitoring situations. They are often preferable over monitoring cameras that operate in the visible range of the electromagnetic spectrum, as the thermal cameras may operate under essentially any light conditions, ranging from pitch dark to sunlight. They are also less sensitive to different light conditions, such as shadows, backlight, darkness and even camouflaged objects. Even in difficult weather conditions, such as smoke, haze, dust and light fog, thermal cameras generally have very good performance. Further, as thermal cameras do not need floodlights even in complete darkness, they also reduce light pollution and lower energy consumption.

Thermal cameras can detect very small differences in temperature, which makes it more difficult for a human to blend with the background. Therefore, thermal cameras are excellent at detecting humans obscured by complex backgrounds or hidden in deep shadows. In addition, many other types of objects also have a different temperature than the surrounding environment, making detection easy. For at least these reasons, thermal cameras can be used in a wide range of security applications, such as perimeter protection around industrial sites, airports and power plants. Their detection capabilities also make them a valuable tool, for example, in search and rescue operations.

As an example, a live video from a thermal camera can inform a camera operator about a person walking among the cars in a parking lot long before a visual camera would detect the movement. When it comes to identification, it is possible to use thermal cameras in situations where privacy is an issue, such as at schools.

Compared to visual cameras, thermal cameras can provide more reliable detection and shape recognition by combining high image contrast with motion detection. This results in fewer false alarms and reduces unnecessary responses and actions by personnel. The cameras also add thermal information to the image, making it possible to monitor processes and detect abnormal behavior when temperatures change, for example, to find heat leaks in buildings or determine whether a car has been driven within a recent period.

Generally, video captured by thermal cameras is not continuously monitored. Rather, only when an event occurs is the operator alerted and will then determine what the problem may be and take an appropriate action. This means that if a thermal camera is tampered with or accidentally redirected, or if the thermal camera becomes dirty, this may go unnoticed for quite some time and might result in various security and reliability issues. This is particularly relevant for systems that include a large number, say a thousand or so, of monitoring cameras, where it may not be feasible or possible for a camera operator to check the "health" of each camera with sufficient regularity. For at least these reasons, there is a need for better methods for detecting malfunction of a thermal camera.

SUMMARY

According to a first aspect, a computer system detects malfunctions in a thermal camera. The method includes:

determining a first average response value for a first shutter image captured by an image sensor in the thermal camera;

determining a second average response value of a second shutter image captured by the image sensor in the thermal camera;

comparing the first average response value and the second average response value; and in response to determining that the first average response value and the second average response value differ by more than a predetermined value, providing an indication of a malfunction of the thermal camera.

This provides a way of automatically detecting whether there is a problem with the thermal camera, such as a deterioration of the image sensor or a mechanical shutter that is stuck, etc., and alerting a user about such a problem. This is particularly useful in large surveillance camera systems where it may not be feasible to continuously monitor all cameras manually.

According to one embodiment the indication can be an indication of deterioration of an image sensor in the thermal camera. As image sensors in thermal cameras tend to deteriorate over time, it is useful to have an automatic indication of when there is a problem with the image sensor and it has reached a level that is not acceptable.

According to one embodiment, the indication can be an indication of a shutter malfunction in the thermal camera. As the shutter is an integral component of the camera and is used periodically for purposes of recalibrating the sensor (and thereby obtaining reliable images), it is important to ensure that the shutter is always performing optimally. Again, while this may not be a significant problem in individual cameras, the risk of undetected shutter problems may increase in large systems that may contain hundreds or thousands of cameras, and therefore it is important to have reliable automated methods for detecting shutter malfunction.

According to one embodiment, the first shutter image and the second shutter image are captured within such a time of each other that the capturing conditions are essentially identical. In order to be able to make a meaningful comparison between the two shutter images, and to increase the reliability of the automatic determination of a problem, the two images are preferably captured under very similar ambient conditions.

According to one embodiment, the time between capturing the first shutter image and the second shutter image is a time that is predetermined based on one or more of: a camera type and a sensor type. This allows an optimal recalibration time interval to be set for the particular type of thermal camera and sensor, and thereby no "extra" shutter images need to be captured.

According to one embodiment, the first shutter image and the second shutter image are captured in response to a measured temperature of the image sensor in the thermal camera. That is, rather than being on a set time schedule, a temperature sensor in the thermal camera can act as a trigger for when to capture the shutter images. This allows the camera to respond more rapidly to quicker temperature changes, and also to save resources and not capture unnecessary images when the temperature remains relatively constant for longer periods of time.

According to one embodiment, the method can include determining a focal plane array temperature at the time of capture of the first shutter image; and retrieving the second shutter image captured at a similar focal plane array temperature from a library of shutter images captured at differing focal plane array temperatures. In some circumstances, there may not be any recent shutter images to use, and in such a scenario, there could be shutter images and/or average response values stored in a library from which data can be obtained. This can also be used to provide a more reliable determination as to what the specific problem is. For example, if a shutter image was captured at similar ambient temperatures one month ago and two months ago, and there is a consistent degradation of the quality of each image, it may be concluded that the problem is likely due to an image sensor degradation rather than a shutter that is stuck.

According to one embodiment, the first average response value and the second average response value are determined for the entire first shutter image and the entire second shutter image, respectively. That is, the entire image is used in order to get most reliable indication of whether there is a possible problem or not.

According to a second aspect, a system for detecting malfunction in a thermal camera is set forth herein. The system includes a memory and a processor. The memory contains instructions that when executed by the processor causes the processor to perform a method that includes:

determining a first average response value for a first shutter image captured by an image sensor in the thermal camera;

determining a second average response value of a second shutter image captured by the image sensor in the thermal camera;

comparing the first average response value and the second average response value; and in response to determining that the first average response value and the second average response value differ by more than a predetermined value, providing an indication of a malfunction of the thermal camera.

The system advantages correspond to those of the method and may be varied similarly.

According to a third aspect, a thermal camera that includes the system in accordance with the second aspect is set forth herein. The thermal camera advantages correspond to those of the method and may be varied similarly.

According to a fourth aspect, a computer program for detecting malfunction in a thermal camera is set forth herein. The computer program contains instructions corresponding to the steps of:

determining a first average response value for a first shutter image captured by an image sensor in the thermal camera;

determining a second average response value of a second shutter image captured by the image sensor in the thermal camera;

comparing the first average response value and the second average response value; and in response to determining that the first average response value and the second average response value differ by more than a predetermined value, providing an indication of a malfunction of the thermal camera.

The computer program involves advantages corresponding to those of the method and may be varied similarly.

The details of one or more embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1A:
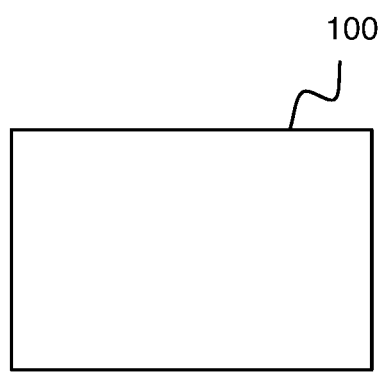
FIGS. 1A-1C are schematic illustrations of an image sensor and a shutter, in accordance with one embodiment.

As was described above, one advantage with the various embodiments is to be able to automatically detect malfunctions in a thermal camera. At a general level, the various embodiments of the work as follows. By using shutter images that are taken for purposes of calibrating the thermal camera, it is possible to determine, for example, whether the sensor has deteriorated (e.g., there is an increasing number of "dead" pixels) or whether the mechanical shutter of the camera is stuck, and to notify an operator of the camera in response to making a positive determination.

More specifically, when a shutter image has been captured, the image is stored and used as a reference when the next shutter image is captured. By comparing the current shutter image and the reference shutter image, and relating the two shutter images to the focal plane array temperature, it can be determined whether there is a problem with the camera. Furthermore, depending on the appearance of the shutter images, it can also be determined whether the problem is due to sensor deterioration or due to a stuck mechanical shutter.

As long as the shutter image analyses are done frequently enough, only the most recent shutter image needs to be saved as a reference image, as capturing conditions will be essentially identical between shutter images. If analyses are done less frequently, a set of shutter images captured at differing focal plane array temperatures can be captured and stored to account for varying capturing conditions, and one of these stored images that is appropriate for the current capturing conditions can then be selected for comparison purposes. Various embodiments will now be described in greater detail by way of example and with reference to the drawings. First, however, a brief overview of thermal cameras will be presented.

A conventional network camera operating in the visible range of the electromagnetic spectrum and a thermal network camera are similar in many aspects, such as compression and the networking features, availability of different form factors for use in different environments and situations, etc. However, two things differ substantially: the lens and the sensor.

Because regular glass blocks thermal radiation, regular glass-based optics and lenses cannot be used in thermal cameras. Currently, germanium is the most commonly used material for thermal camera optics. Germanium, which is an expensive metalloid that is chemically similar to tin and silicon, blocks visible light while letting through the IR light. There are also alternatives to using pure germanium. For example, some lenses are made of a germanium-based material called chalcogenide glass, which allows a wider spectrum of IR light to pass through.

Like conventional lenses, thermal lenses come in different focal lengths. A longer focal length results in a narrower field of view. The field of view depends on the focal length and the diameter of the sensor. The sensor in a thermal camera is an array of thousands of detectors that are sensitive to thermal infrared (IR) radiation. The detectors used for thermal imaging can be broadly divided into two types: cooled and uncooled IR sensors. Uncooled IR image sensors are smaller and built with fewer moving parts, which makes them less expensive than their cooled counterparts. Cameras with cooled sensors generally need to be serviced, and also have the cooling medium refilled every 8,000-10,000 hours. Most commercially available thermal cameras use uncooled IR sensors, and therefore the description herein will refer to such sensors. However, it should be noted that the techniques in accordance with the various embodiments can be applied to any type of thermal camera that uses a mechanical shutter, and that the claims should not be construed as being limited only to thermal cameras with uncooled sensors.

Figure 1B:
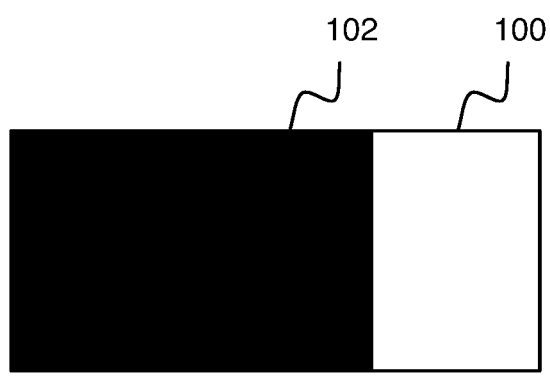
Figure 1C:
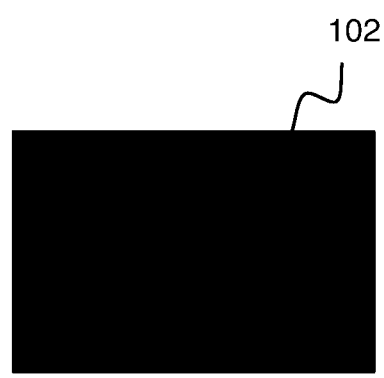

The individual elements in an uncooled sensor respond in different ways to the incoming IR radiation. This results in a "drift" in individual pixel values. To remedy this, the sensor periodically performs non-uniformity correction. This is done by letting a mechanical shutter block the sensor and gives the sensor a standard and uniform temperature target, against which every pixel is corrected. The image that is recorded when the shutter blocks the sensor is referred to as a shutter image. This calibration process occurs at regular time intervals, or when a specific temperature change takes place. FIG. 1A shows a schematic view of an image sensor 100 in a completely open configuration, FIG. 1B shows a schematic view of the image sensor 100 when it is partly blocked by the mechanical shutter 102, and FIG. 1C shows a schematic view of the image sensor 100 when it is completely blocked by the shutter 102, and at which point the shutter image is recorded. It should be noted that while the image sensor 100 and the mechanical shutter 102 are illustrated in FIGS. 1A-1C as having a rectangular shape, the techniques described herein are applicable to sensors and shutters having any geometrical shape that can be used in a thermal camera.

Uncooled sensors typically operate in the Long-wave Infrared (LWIR) band, at about 8-15 micrometers wavelength, and can be based on a variety of materials that all offer unique benefits. One common design is based on microbolometer technology, which is well known to those having ordinary skill in the art. Microbolometers generally make up an array of pixels, each constructed from a microbolometer including thermo-sensing material whose electrical resistivity changes as it absorbs incident IR radiation. The IR-absorbing material is connected to a read-out circuit by means of electrodes and a reflector is arranged inside the IR-absorbing material for reflecting back IR radiation passing through the absorbing material. In order to reduce the influence of convection on the heat absorbing properties of the pixels, the microbolometer is encapsulated in vacuum. A getter material may be deposited in the microbolometer for reacting with or adsorbing gas molecules released inside the microbolometer, thereby extending the longevity of the vacuum. IR radiation incident on the microbolometer changes the resistivity of the IR-absorbing material, and the change is transferred to the read-out circuit for processing. The change in resistivity is translated into a temperature of the part of the captured scene from which the IR radiation originated.

Resolutions are generally lower for thermal cameras than for conventional network cameras. This is mostly due to the more expensive sensor technology involved in thermal imaging. The pixels are larger, which affects the sensor size and the cost of materials and production. Currently, typical resolutions for thermal cameras range from 160×120 to high resolutions of 640×480 (VGA), though even higher and lower resolutions are available.

Figure 2:
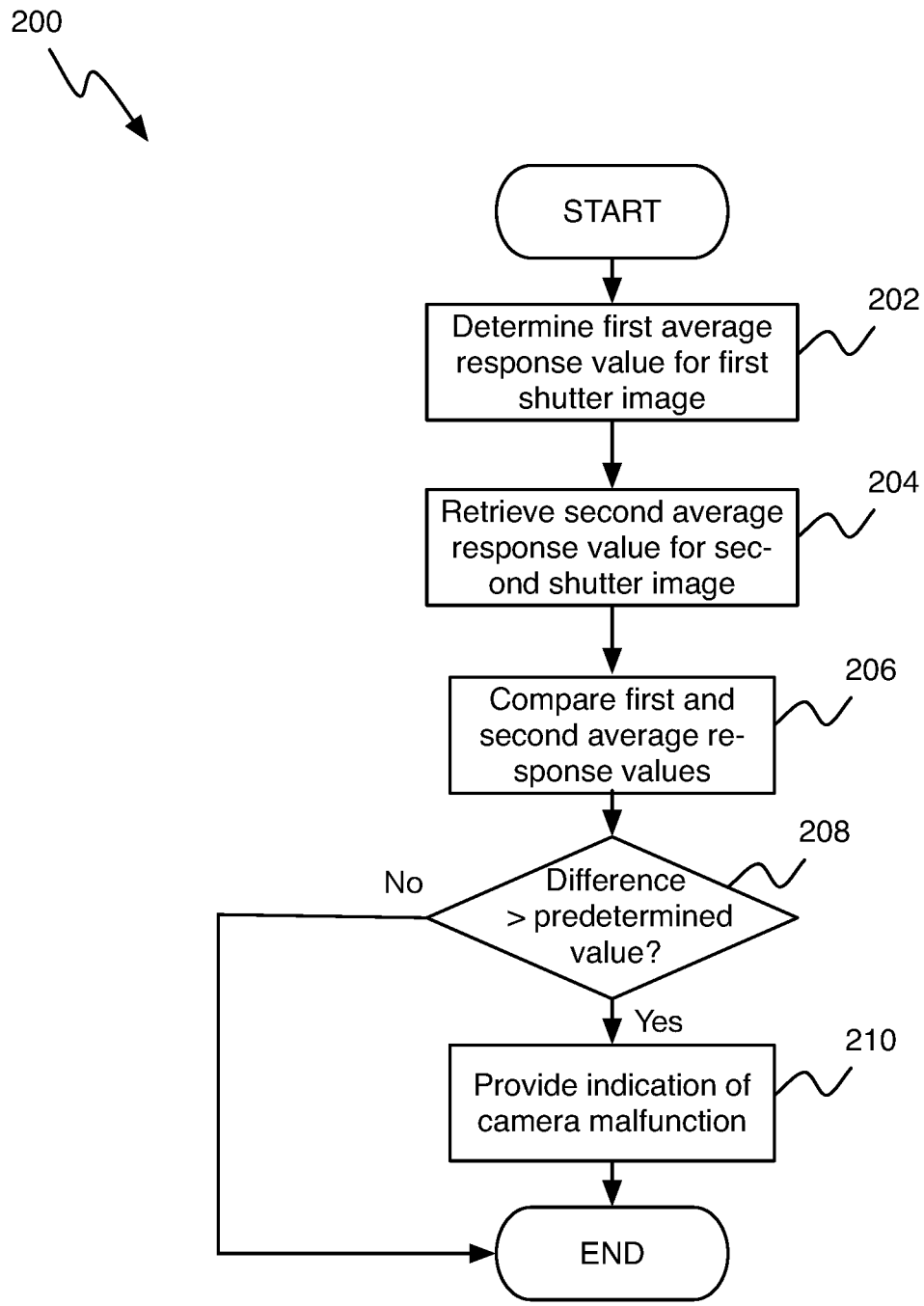
FIG. 2 is a flowchart depicting a process for detecting malfunction in a thermal camera, in accordance with one embodiment.

FIG. 2 is a flowchart of a method 200 for detecting malfunction in a thermal camera, in accordance with one embodiment. As can be seen in FIG. 2, the method 200 starts by determining an average response value for a first shutter image, step 202. The first shutter image is a "current image" that is captured as described above with respect to FIG. 1C with the shutter in a closed position where the image sensor 100 is blocked. When capturing the first shutter image, every pixel in the sensor generates a response value, which essentially can be described as an output signal of the pixel in relation to the input intensity. By calculating the average of the response values for the different pixels of the sensor, a single numerical value can be obtained that is representative of the first captured shutter image. This "average response value" can be, for example, a mean value or a median value, of the response values for the different pixels in the microbolometer. In some implementations a minimum/maximum or a range between the minimum/maximum values can also be used as a value representing the shutter image. In yet other implementations, various types of statistical models may be used. One example of such a statistical model would be the pixel intensity distribution as a histogram. If the pixel intensity distribution deviates from a stored or previous distribution by more than a certain amount, it may be an indication that there is some kind of problem.

It should also be noted that the average response value does not need to be calculated using every single pixel of the image sensor. There may be situations in which it is known a priori that there are some pixels of the sensor that are "dead," or that the camera operator really only cares about the portion of a scene that is captured by a particular region of the sensor. In such cases, it could make sense to only include the pixels that are "of importance" when determining the average response value. Many such variations could be envisioned by those having ordinary skill in the art, based on the particular circumstances at hand.

Next, a stored average response value is retrieved for a second shutter image captured by the same camera in step 204. The stored average response value is determined in the same manner that was described above, and is representative of a previously captured shutter image. The second shutter image can be the shutter image that was most recently captured, or it can be a shutter image that was captured some time ago and for which the average response value (or other statistical measure, as described above) has been stored. The important point to note is that the two shutter images should be captured by the same thermal camera and under essentially identical ambient conditions. Essentially, the required degree of "similarity" between the two images is governed based on what kind of error the system operator is interested in detecting. In general, shutter malfunction is easier to detect, even under less similar conditions, but a sensor degradation on the other hand, typically requires a greater similarity of conditions between the two shutter images.

The two average response values are then compared in step 206, for example, by subtracting one value from the other, and then determining in step 208 if the result (i.e., the absolute value) exceeds a predetermined value. The predetermined value can be set by an operator of the thermal camera to allow for some variation, say, if the ambient temperature changed by a degree or two during the time period between the two shutter images were captured. The predetermined value can be set as an absolute value, or as a relative value (e.g., a 5% difference), depending on the particular circumstances at hand.

If it is determined in step 208 that the difference between the two average response values is smaller than the predetermined value, no action is taken and the process 200 ends. However, if it is determined in step 208 that the difference between the two average response values exceeds the predetermined value, this may indicate a malfunction of the thermal camera (e.g., the shutter may have suffered a mechanical error and may be stuck in a position where only a portion of the sensor is covered, as shown in FIG. 1B, for example, or the image sensor itself may have experienced some degradation). In response to detecting such a difference, an indication of a malfunctioning camera is provided. The indication can be an alert sent to the operator of the camera, or an automated call to a servicing company to visit the site of the camera, etc. Many variations can be implemented by those having ordinary skill in the art.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, a rectangular mechanical shutter has been used by way of example in the various embodiments described above. However, a shutter may also take several other forms such as a flat surface of any shape which is moved into the optical path, an iris, or a mirror which directs the view of the detector to a uniform surface within the camera. Thus, many other variations that fall within the scope of the claims can be envisioned by those having ordinary skill in the art.

The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting malfunction in a thermal camera, comprising:
    determining a first average response value for the individual pixels of a first shutter image captured by an image sensor in the thermal camera when the shutter is in a position blocking the image sensor;
    determining a second average response value for the individual pixels of a second shutter image captured by the image sensor in the thermal camera when the shutter is in a position blocking the image sensor and under essentially identical capturing conditions to the first shutter image;
    comparing the first average response value and the second average response value; and
    in response to determining that the first average response value and the second average response value differ by more than a predetermined value, providing an indication of a malfunction of the thermal camera.

2. The method of claim 1, wherein the indication is an indication of deterioration of an image sensor in the thermal camera.

3. The method of claim 1, wherein the indication is an indication of a shutter malfunction in the thermal camera.

4. The method of claim 1, wherein the time between capturing the first shutter image and the second shutter image is a time that is predetermined based on one or more of: a camera type and a sensor type.

5. The method of claim 1, wherein the first shutter image and the second shutter image are captured in response to a measured temperature of the image sensor in the thermal camera.

6. The method of claim 1, further comprising:
    determining a focal plane array temperature at the time of capture of the first shutter image; and
    retrieving the second shutter image captured at a similar focal plane array temperature from a library of shutter images captured at differing focal plane array temperatures.

7. The method of claim 1, wherein the first average response value and the second average response value are determined for the entire first shutter image and the entire second shutter image, respectively.

8. A system for detecting malfunction in a thermal camera, comprising:
    a memory; and
    a processor,
    wherein the memory contains instructions that when executed by the processor causes the processor to perform a method that includes:
        determining a first average response value for the individual pixels of a first shutter image captured by an image sensor in the thermal camera when the shutter is in a position blocking the image sensor;
        determining a second average response value for the individual pixels of a second shutter image captured by the image sensor in the thermal camera when the shutter is in a position blocking the image sensor and under essentially identical capturing conditions to the first shutter image;
        comparing the first average response value and the second average response value; and
        in response to determining that the first average response value and the second average response value differ by more than a predetermined value, providing an indication of a malfunction of the thermal camera.

9. The system of claim 8, wherein the first shutter image and the second shutter image are captured in response to a measured temperature of the image sensor in the thermal camera.

10. A thermal camera, comprising the system of claim 8.

11. A non-transitory computer readable storage medium having program instructions embodied therewith, the program instructions being executable by a processor to perform a method for detecting malfunction in a thermal camera, the method comprising:
    determining a first average response value for the individual pixels of a first shutter image captured by an image sensor in the thermal camera when the shutter is in a position blocking the image sensor;
    determining a second average response value for the individual pixels of a second shutter
    image captured by the image sensor in the thermal camera when the shutter is in a position blocking the image sensor and under essentially identical capturing conditions to the first shutter image;
    comparing the first average response value and the second average response value; and
    in response to determining that the first average response value and the second average response value differ by more than a predetermined value, providing an indication of a malfunction of the thermal camera.

12. The non-transitory computer readable storage medium of claim 11, wherein the first shutter image and the second shutter image are captured in response to a measured temperature of the image sensor in the thermal camera.

* * * * *